United States Patent [19]

Marcum, Jr. et al.

[11] Patent Number: 5,046,775
[45] Date of Patent: Sep. 10, 1991

[54] SNAP-LOCK FASTENER FOR TRUCK BED LINERS

[75] Inventors: Howard W. Marcum, Jr.; John R. Snyder, both of Wapakoneta; Robert E. Stebens, Columbus, all of Ohio

[73] Assignee: LRV Acquisition Corporation, Wapakoneta, Ohio

[21] Appl. No.: 505,783

[22] Filed: Apr. 6, 1990

[51] Int. Cl.⁵ .................... B60R 13/01; F16B 5/00
[52] U.S. Cl. .................. 296/39.2; 411/508; 411/913; 24/297
[58] Field of Search ............... 296/39, 2; 411/508, 411/509, 510, 908, 913; 24/453, 297, 573.2; 52/511

[56] References Cited

U.S. PATENT DOCUMENTS

| | | | |
|---|---|---|---|
| 2,853,913 | 9/1958 | Rapata | 411/505 |
| 3,029,486 | 4/1962 | Raymond | 24/297 X |
| 3,093,027 | 6/1963 | Rapata | 411/508 |
| 3,093,874 | 6/1963 | Rapata | 411/508 |
| 4,122,583 | 10/1978 | Grittner et al. | 52/511 X |
| 4,181,349 | 1/1980 | Nix et al. | 296/39 R |
| 4,470,737 | 9/1984 | Wollar | 411/508 |
| 4,595,229 | 6/1986 | Wagner | 296/39 R |
| 4,659,133 | 4/1987 | Gower | 296/39 R |
| 4,677,714 | 7/1987 | Wright | 24/297 X |
| 4,708,895 | 11/1987 | Mizusawa | 411/509 X |
| 4,740,026 | 4/1988 | Wagner | 296/39 R |
| 4,768,822 | 9/1988 | Gower | 296/39 R |
| 4,796,942 | 1/1989 | Robinson et al. | 296/39.2 |
| 4,850,633 | 7/1989 | Emery | 296/39.2 |
| 4,906,040 | 3/1990 | Edwards | 296/39.2 |
| 4,924,561 | 5/1990 | Yoneyama | 411/508 X |

FOREIGN PATENT DOCUMENTS

| | | | |
|---|---|---|---|
| 250088 | 10/1962 | Australia | 411/508 |
| 1364425 | 5/1964 | France | 411/508 |
| 1576385 | 8/1989 | France | 411/508 |

Primary Examiner—Margaret A. Focarino
Assistant Examiner—Joseph D. Pape
Attorney, Agent, or Firm—Frost & Jacobs

[57] ABSTRACT

A fastening device is provided for securing of liners to the interior of pickup truck cargo beds. The fastening devices include a base plate which overlies the outer surface of a bed liner and a locking tongue projecting laterally from a bottom of the plate to extend through an aperture in the liner sidewall and to mechanically couple with a flange of the cargo bed sidewall to effect clamping of the liner to the flange. The locking tongue is formed with a peripheral edge surface that includes a locking surface angularly disposed with respect to the base plate forming in cooperation therewith for receiving edge portions of the liner and flange in clamped relationship, a camming surface that rides against an edge of the aperture in the liner during insertion to facilitate assembly and a locking surface that automatically engages the liner to maintain the fastening device in locking engagement. Auxiliary components in the nature of secondary clamping brackets, or connecting devices to which cargo tie-down devices may be attached, are provided in combination with the basic fastening device in modified structures. Modified forms of the basic fastening device are provided with a plurality of locking tongues to enhance the device's ability to resist torsional forces such as those likely encountered when used to also function as a cargo tie-down point.

35 Claims, 5 Drawing Sheets

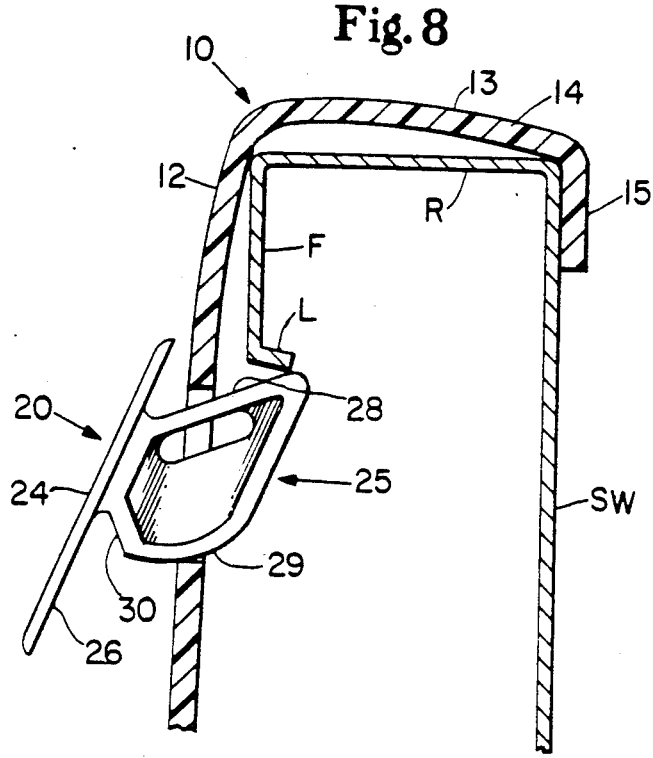
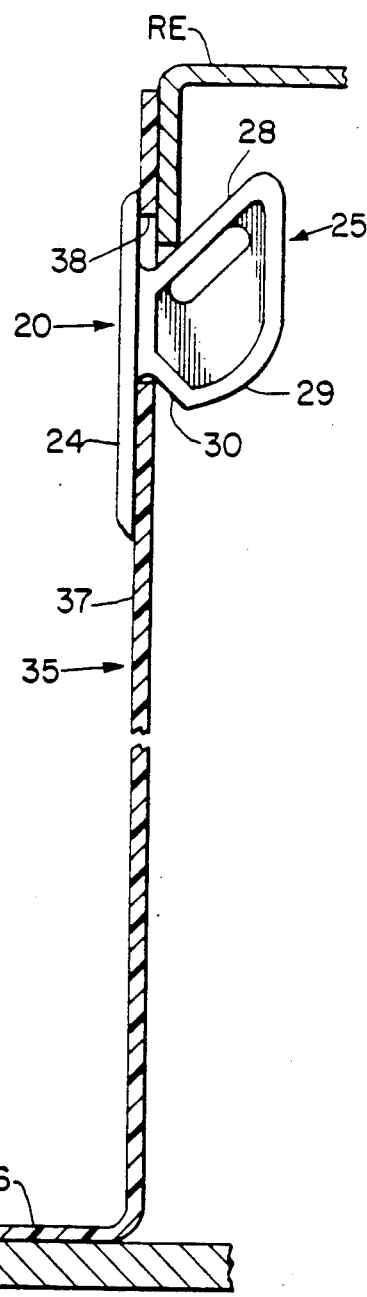
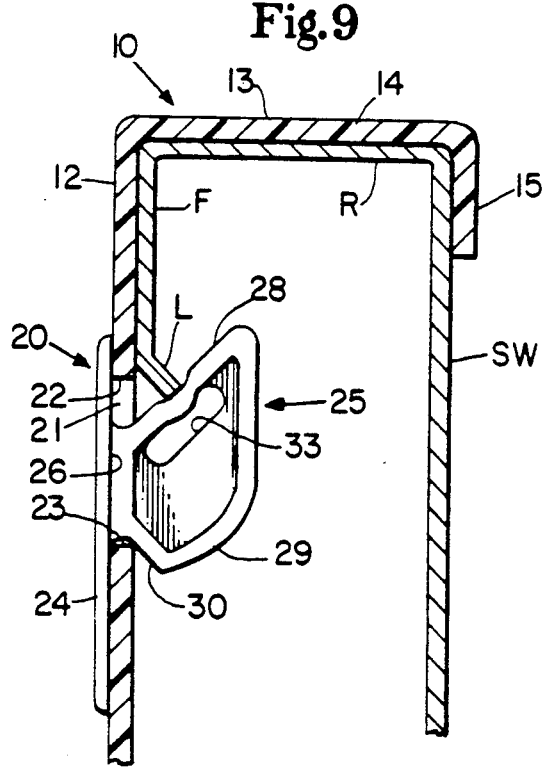

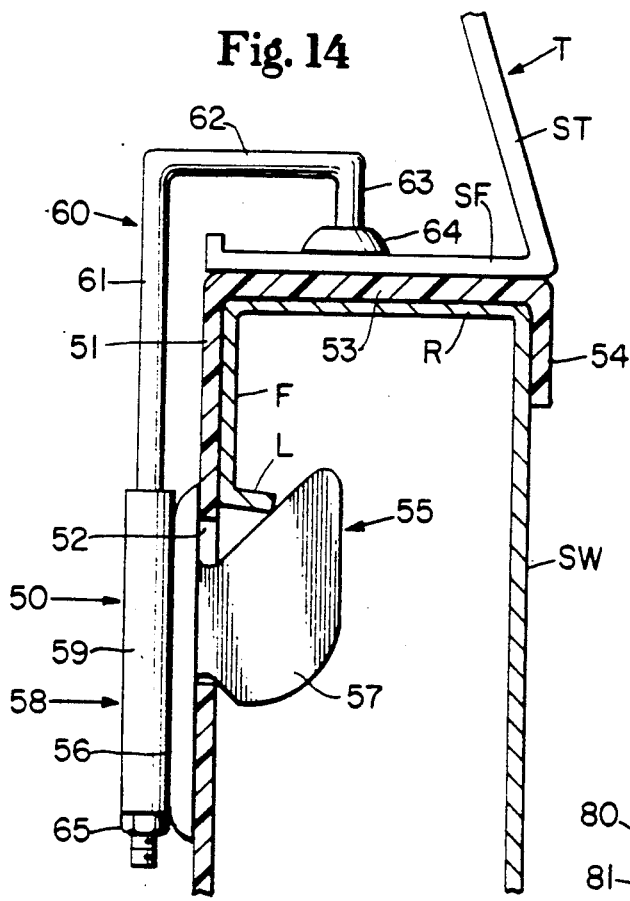
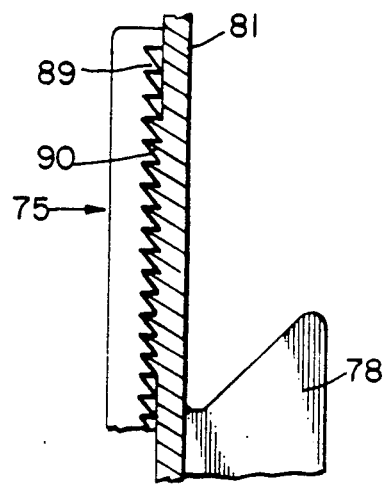
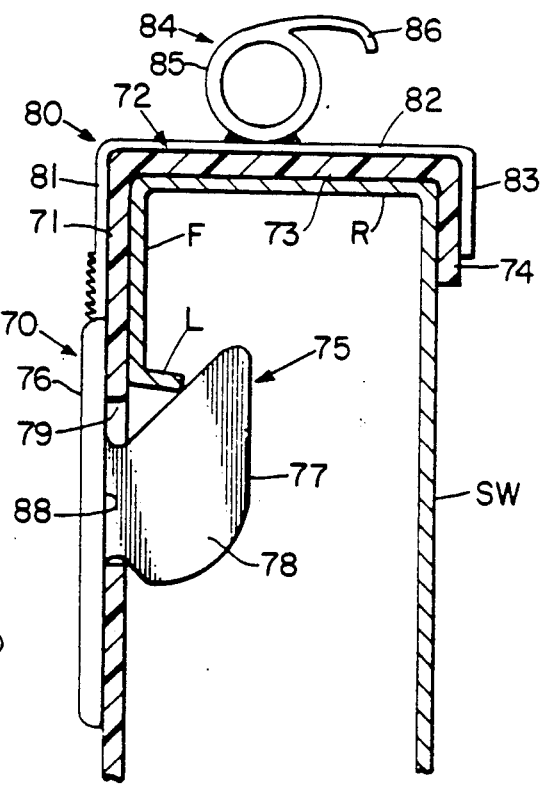
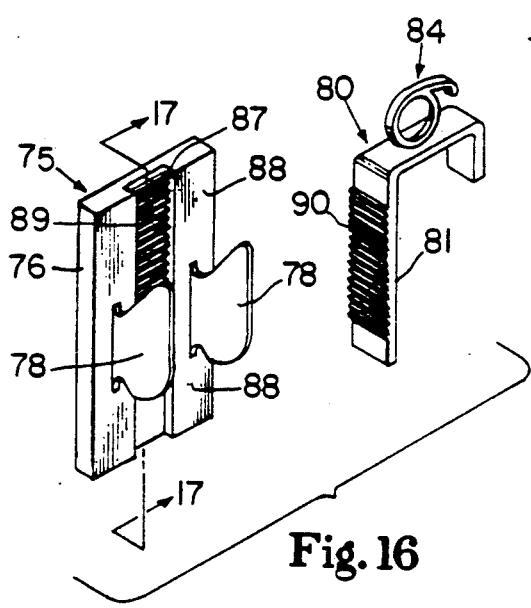

SNAP-LOCK FASTENER FOR TRUCK BED LINERS

FIELD OF THE INVENTION

This invention relates in general to protective liners for the interior of the cargo beds of pickup style trucks. It relates more particularly to a fastener for mechanically securing of a liner to the cargo bed sidewalls and which is of a structure that snaps into a self-locking interference engagement with the liner and sidewall to effect a clamping function. It further relates to a fastener having a configuration such that its application is facilitated through a cam surface arrangement that facilitates the mechanical interengagement of the fastener to the sidewall.

BACKGROUND OF THE INVENTION

Trucks of the pick-up style are provided with an open top cargo bed having a bottom or floor surrounded by longitudinal sidewalls with a front wall interconnecting the two sidewalls forming a U-shaped structure. Such cargo beds are also usually provided with a hinged tailgate which, in some instances, may be removed and may be provided with a separate protective liner. The interior surfaces of the cargo bed are invariably subjected to mechanical damage as a consequence of placement of articles within the cargo bed which may, in certain instances, be accomplished in an advertently careless manner as well as a consequence of subsequent shifting or movement of those articles during the course of transit. In those situations where the cargo consists of heavy boxes, tools or other similar items, these have a tendency to scrape the wall surfaces, both side and bottom, and at times to even puncture those walls, thereby at least causing damage to the protective finishes which consequently results in rusting of the sheet metal from which the cargo beds are fabricated as well as detracting from their appearance. To at least minimize if not prevent such damage, it has become a common practice to utilize a liner which is configured to have a bottom wall that overlies the bottom of the bed and sidewalls that extend upwardly adjacent the side and front walls of the cargo bed space. Such a liner may be made of rubber based materials or it may be fabricated from synthetic resin or plastic materials which are molded into a configuration that is complemental to the cargo bed space for a particular model and make of truck.

While a bed liner may be fabricated in a configuration that is complemental to the truck bed cargo space and fits relatively snugly when molded to the dimensional specifications of a particular make and model truck, the liners nevertheless generally require some means for mechanically securing of the liner in the cargo bed. One major reason for securing of the liners is that, especially in the instances when no cargo is being carried, movement of the truck results in airflow over the cargo bed that does have a tendency to lift and move the liners which are not particularly heavy and capable of maintaining themselves in the desired positions. Securing of the liners is particularly important with respect to the vertical sidewalls to avoid having them folded and collapsed into the interior of the cargo bed as a consequence of placing the cargo into the cargo bed through movement over the sides of the bed whereby the cargo may engage the liner and otherwise displace it from its desired vertical position. To assist in maintaining of the sidewalls in a vertical position, it is also a common practice to form the liner sidewalls with extending edges at the upper edges thereof and which overlie and engage with the top rail of the cargo bed. While the overlying flange will tend to support the liner in a desired position, in some instances the flange is fabricated to extend over the outside of the cargo bed rail to better achieve this objective. Merely providing of a flange has not been found to provide sufficient securing of the liner sidewalls to the cargo bed.

Accordingly, in view of the known inability of the liners to be capable of maintaining themselves in the desired position and configuration within a cargo bed, it is a generally accepted practice to also utilize mechanical fastening devices to secure the vertical longitudinally extending sidewalls of the liner to the vertical sidewalls of the cargo bed. It is preferred that these fastening devices be of a type and construction such that it is not necessary to drill holes in the sidewalls or associated structures of the cargo bed since those walls are made of sheet metal and drilling holes would enhance the initiation of rusting. Consequently, fastening devices that have heretofore been utilized have been of a type that either is designed to interfit with existing openings in the truck bed wall or to effect a clamping of the liner to elements of the cargo bed wall. Those devices which utilized openings already formed in the cargo bed have included toggle bolts which have a foldable element that is projected through the openings and therafter opens to effect a clamping function. Examples of openings that are formed in the cargo beds are the sockets into which stakes of the frequently utilized sidewall extensions are inserted. A disadvantage of that type of fastening device is that it then prevents utilization of the stake socket for attachment of sidewall extensions if those should be desired.

Other devices that have been utilized are of a C-type clamp structure which have a component that overlies the outside of the liner and a cooperating element that is placed within the space between the liner and the cargo bed sidewalls and functions to clamp this liner sidewall to the cargo bed sidewall. A problem with such known clamping devices is that they are difficult to install since they have elements that are positioned within a closed space where it is not possible to visually ascertain the location and functioning of the element to assure that it is properly engaged and positioned with respect to the element of the bed sidewall to effect the securing and clamping of the liner. Such clamping devices are also relatively complex in their construction and that complexity adds to their cost.

SUMMARY OF THE INVENTION

In accordance with this invention, a fastener is provided for use in cooperation with a truck bed liner for securing of the liner to the walls of the cargo bed through a snap-type locking function which is easily assembled with the liner and cargo bed sidewalls. The fastener of this invention effects not only a clamping of the liner to the sidewall, but it also functions to secure the liner sidewalls against vertical displacement and accomplishes both of these functions without the necessity of drilling or forming any holes in the metal components of the cargo bed sidewalls. The fastener of this invention includes a base plate which is adapted to overlie the vertical surface of the liner sidewall at the interior of the cargo bed and a locking tongue which projects perpendicularly from the base plate and is adapted to project through an opening in the liner to mechanically interlock with components of the cargo bed wall. Although the fastener of this invention was initially designed for the purpose of functioning with cargo bed sidewalls that have a flange or lip at the upper edge, it is capable of similar functioning in other applications in that the tongue is of a configuration such that it will mechanically interlock with an element such as a flange or lip of the cargo bed wall and cooperatively force the base plate into clamping engagement between the liner and the supporting element of the cargo bed or other structure in the case of different applications of this fastener.

The fasteners of this invention have a tongue that is configured with an angled clamping surface that is dimensioned and oriented with respect to the base plate to enable the fastener to be universally used with most types of cargo beds even though there are various differences in the construction of the sidewalls of those beds and the top rail structures. That clamping surface is also configured to create essentially equal, horizontal and vertical forces in the securing of the liner to the bed sidewall, thereby effecting both lateral clamping forces as well as vertical forces tending to hold the liner down into the truck bed. Additionally, the tongue is configured with a cam surface that cooperates with the opening in the liner to facilitate the assembly of the fastener with the liner and the supporting sidewall structure. This camming feature minimizes the mechanical force that must be applied in inserting the fastener and it also results in self-locking of the fastener to the liner in the nature of a snap-lock function. This camming feature greatly reduces the assembly time as there is little time required for effecting the insertion of the fastener and achieving the locking of the fastener to the liner.

While the fastener of this invention was designed primarily for utilization in effecting securing of a liner to the interior of a pickup cargo bed, the fasteners may be otherwise utilized in securing of sheet-form panels in a manner similar to the securing of the sheet-form sidewalls of the bed liners. These fasteners may be utilized in securing of two sheet-form panels together in superposed relationship. This can be effected by one of the sheets being of relatively rigid characteristics similar to the rigidity of the cargo bed sidewall and the fastener will then function in a same manner. Thus, the fasteners may be utilized by inserting the tongue through aligned openings in overlapped portions of two sheet-form panels. These fasteners may also be used to secure together two panels regardless of whether either has any significant structural rigidity. By forming the opening in at least one of the panels of a length that results in a snug fit with the tongue, the tongue will operate against the opposed ends of the opening resulting in the fastener being mechanically locked to one of the panels and securing the second panel.

A modified fastener structure in accordance with this invention is designed to not only effect the securing of a bed liner to a cargo bed sidewall, but to also provide a means of clamping and securing a top cap to a cargo bed. These modified fastener devices which include a base plate and tongue for effecting the securing of the liner to the cargo bed sidewall include a clamp rod that is secured at one end to the base plate and has an L-shaped upper portion that is caused to bear against a bottom mounting flange of the top to effect clamping of that flange to the top rail of the cargo bed sidewall.

Another modified fastening device embodying this invention is designed to perform the dual functions of securing a bed liner to a cargo bed sidewall and to also provide a tie-down point enabling use of ropes or other devices for securing of articles in the cargo bed. This modified fastener structure comprises a fastening element having a base plate with locking tongue and a tie-down bracket. The tie-down bracket is adapted to interfit over the top of the cargo bed rail in clamping relationship and to mechanically couple with the fastening element in interlocked engagement when assembled with the liner in securing of the liner to the cargo bed. Rings and hooks are included with the tie-down bracket for interconnection with a rope or other tie-down device.

While designed primarily for use with a tie-down bracket to enhance stability, a modified fastening element is provided having two tongue elements of identical configuration that mutually effect locking with the flange of a cargo bed sidewall. The two tongue elements are secured to the fastening element's base plate in spaced parallel relationship, thereby enhancing lateral stability by resisting twisting of the fastening element that could otherwise result from forces applied to the tie-down bracket.

These and other objects and advantages of this invention will be readily from the following detailed description of the illustrative embodiments thereof and the accompanying drawings.

DESCRIPTION OF THE DRAWING FIGURES

FIG. 8 is a fragmentary sectional view similar to FIG. 6, but showing the operation of the fastener in positioning of a distorted liner with respect to the cargo bed rail.

FIG. 9 is a fragmentary sectional view similar to FIG. 2, but showing a fastener securing a liner to a cargo bed side rail that is of a slightly different configuration.

FIG. 10 is a diagrammatic vertical sectional view showing a fastener securing a sheet-form panel against a supporting surface and with a support element.

FIG. 14 is a fragmentary sectional view similar to FIG. 2 showing a modified fastener having a clamp for securing of a top to a pickup truck bed.

FIG. 15 is a fragmentary sectional view similar to FIG. 2 showing another modified fastening device and which is provided with a tie-down bracket to which cargo tie-down devices may be secured.

FIG. 16 is a perspective view of the fastening device shown in FIG. 15 with the fastening element and tie-down bracket separated for clarity of illustration.

FIG. 17 is a sectional view on an enlarged scale taken along line 17—17 of FIG. 16 as seen with the two components assembled into operative relationship.

DESCRIPTION OF THE ILLUSTRATIVE EMBODIMENTS

Figure 1:
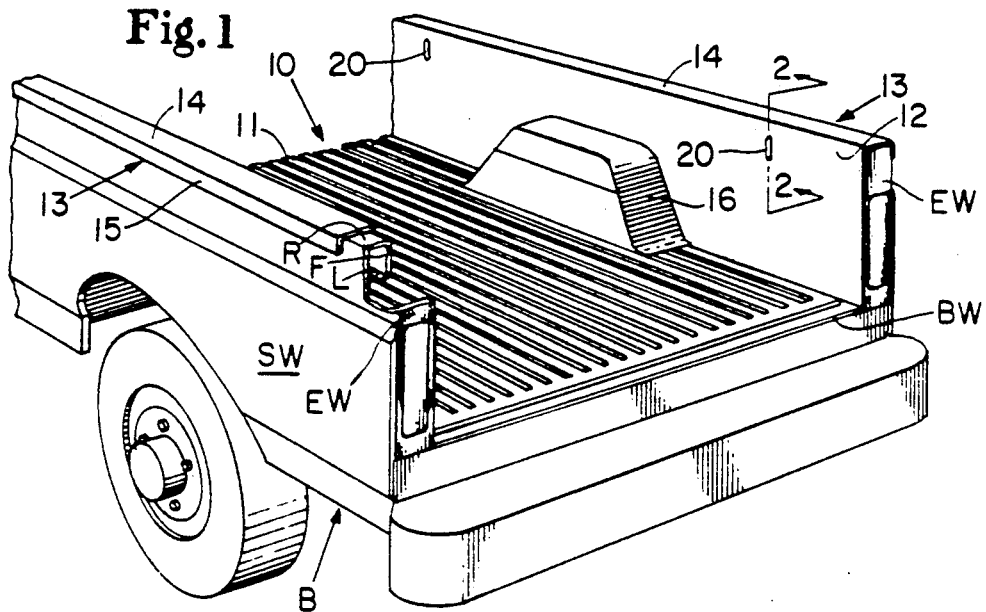
FIG. 1 is a perspective view of a portion of a pickup truck cargo bed having a liner installed therein with fasteners embodying this invention.

Referring to FIG. 1, a portion of the cargo bed B of a pickup type truck is shown with a bed liner designated generally by the numeral positioned within its interior. The truck cargo bed B comprises a floor or bottom wall BW and vertically disposed, spaced apart longitudinal sidewalls SW. Each of the cargo sidewalls SW in this illustrative cargo bed which is typical of many makes and models has a top rail R disposed in a generally horizontal plane and projecting a distance inwardly from the respective vertical portion of the sidewall. Formed with the top rail R at its inner edge is a downwardly projecting flange F having a bottom edge formed with a lip L extending in a direction toward the outer portions of the sidewall SW. The sidewall and its top rail R and flange F vary as between different models and makes of trucks, both as to the dimensions of the several elements as well as the particular shapes. Similarly, the bottom of the flanges F and associated lips L vary as between various makes and models of the trucks and this differentiation is diagrammatically illustrated in comparing FIG. 2 with FIG. 9 which illustrate the ability of the fastening device of this invention to accommodate these variations. A cargo bed of this type is normally provided with a tailgate, however, the tailgate is not shown to simplify illustration. It will also be noted that the sidewalls SW normally terminate as is shown in an end wall EW that generally closes the end space between the vertical sidewall SW and the associated flange F. This cargo bed structure is a typical configuration and it will be understood that there are variations in specific structures and dimensions.

Figure 2:
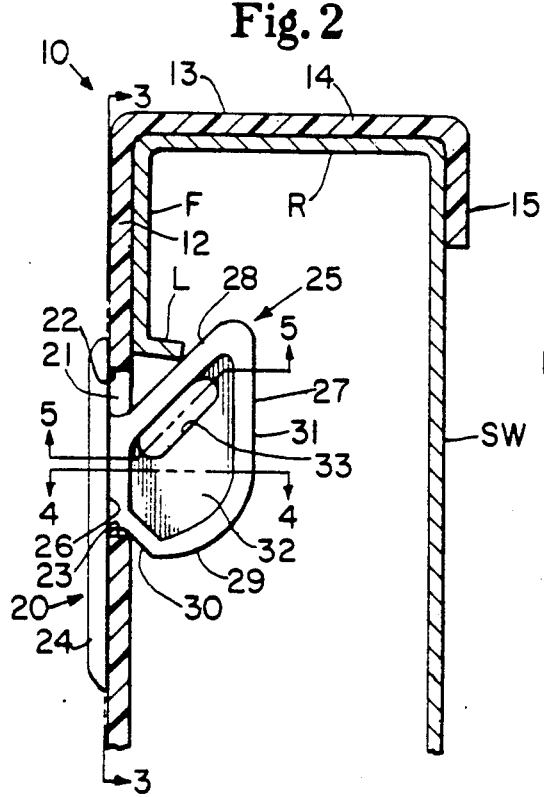
FIG. 2 is a fragmentary sectional view on an enlarged scale taken along line 2—2 of FIG. 1.

The cargo bed liner designated generally by the numeral 10 and shown positioned within the cargo bed B is of a configuration and dimension such that it is complemental to the dimension and configuration of the cargo bed. As such, the liner is formed with a bottom wall 11 that is of a width and length to cover the bottom BW of the cargo bed B. It will be noted that FIG. 1 shows only a rear portion of the cargo bed as well as of the liner. The front wall of the cargo bed and the front portions of the liner are omitted to simplify illustration as those portions of the bed and liner are not essential to an understanding of the structure and functioning of the fastening devices of this invention in cooperation with a liner and cargo bed. It will be understood, however, that the liner is also complemental to the cargo bed at the forward end and would include a front wall extending between the sides. Extending upwardly from the bottom wall 11 of the liner are the respective sidewalls 12 which are shown as being of a design having a top cap 13 adapted to overlie and essentially cover the top rail R of the cargo bed. As can be seen in FIG. 2, this top cap 13 has a horizontally disposed flange 14 adapted to extend over the horizontal rail R and terminates in a downwardly projecting lip 15 that extends a short distance downwardly over the outer surface of the sidewall SW. This configuration of the top cap of the liner provides substantial protection to the top rail as well as the outer corner at the juncture of the sidewall to the rail, but for operation and functioning of the fastening device of this invention in this illustrative application, it is only essential that the top cap have a horizontal flange 14 that rests on the top of the rail R. This illustrative liner 10 and the associated cargo bed are shown as being of a type where the cargo bed is provided with wheel wells that project inwardly of the sidewalls SW and are partially disposed in the cargo space. The liner 10 is accordingly formed with portions 16 that are configured to extend over and around those wheel wells. It will be understood that some pickup trucks are constructed such that the cargo bed is positioned between the wheels, and thus, eliminates the necessity of wheel wells. Again, this particular feature does not have any significance as to the present invention, but it is noted for purposes of illustration.

A cargo bed liner 10 of this type is generally fabricated from a synthetic resin or plastic material and is molded into the desired configuration to be complemental to the interior of the cargo bed of one or more makes and models of pickup trucks. While these vehicles are normally of a relatively standard size as to the cargo bed, there are variations in dimensions as between the cargo beds of different manufacturers as well as perhaps models within a particular manufacturer's line of trucks. Ideally, a liner is of a size and shape to be complemental to the cargo beds of as many as possible different makes and models of trucks to minimize the number of liners that must be carried in stock to satisfy customer demand. It will also be noted that while the liner illustrated in the drawings is provided with a top cap 13, it is not necessary that the liner be so constructed to utilize the fastening devices of this invention as will be described in subsequent paragraphs with respect to illustrative drawings. A liner may be fabricated so that it has only the vertical sidewalls 12 with an upper longitudinal edge portion that is disposed adjacent the top rail flange 14 of the cargo bed sidewall.

FIG. 1 illustrates application of fastening devices of this invention designated generally by the numeral 20 for securing of a liner 10 to a cargo bed B. In FIG. 1, two such devices 20 are shown securing of the one sidewall 12 to the cargo bed sidewall, but it will understood that the number may be increased and it will be further understood that a similar number of fastening devices will be applied to the opposite sidewall 12 of the liner. The specific location of the fastening devices may be varied in accordance with particular liners and truck cargo beds in which the liners are intended to be installed. It is not usually necessary that fastening devices be utilized in association with the front walls of the liner and cargo bed.

Structural configuration of the fastening devices 20 of this invention and their functioning with a liner and cargo bed is shown and will be best understood with reference to FIGS. 2-8. The liners 10 with which the fastening devices 20 of this invention are designed to cooperate have a plurality of apertures 21 formed in the sidewalls 12 at the locations where it is deemed most appropriate to employ the fastening devices. These apertures 21 which may be formed in the liner sidewalls 12, such as by die cutting after the liner is molded, are of an elongated, generally rectangular shape oriented with their long axes vertically disposed. For purposes as will become apparent, these apertures are vertically positioned on the liner such that their upper ends 22 are located slightly below the lower edge of the flange F or the lip L of the cargo bed's sidewall as can be best seen in FIGS. 2 and 3. Both the upper end 22 and the lower end 23 of the apertures are arcuately shaped and may advantageously be semicircular for better functioning as will be subsequently explained. Forming of the apertures 21 in the sidewalls 12 of the liner has the advantage of enabling a particular liner configuration and dimension to be adapted for use with a number of cargo bed sidewalls that are differently configured and dimensioned within adaptable ranges. Forming of the apertures 21 by the manufacturer of the liner has the particular advantage of minimizing the work required by the consumer in installing a liner. This also better assures that the apertures will be correctly located on the liner for secure attachment to the cargo bed. This forming of the apertures by the manufacturer also has the advantage in that the apertures will be accurately dimensioned and configured for best operation and functioning with the fastening devices 20 as will become apparent from the further description of the structure of the fastening devices and their operation.

In accordance with this invention, the fastening devices 20 comprise a base plate 24 and a locking tongue 25. The base plate is of generally rectangular shape in plan view and is of a size to extend laterally outward from each peripheral edge of an aperture 21 with which the fastening device is to be utilized and includes a base surface 26 adapted for positioning in contacting engagement with an opposed surface of the liner sidewall 12.

Figure 3:
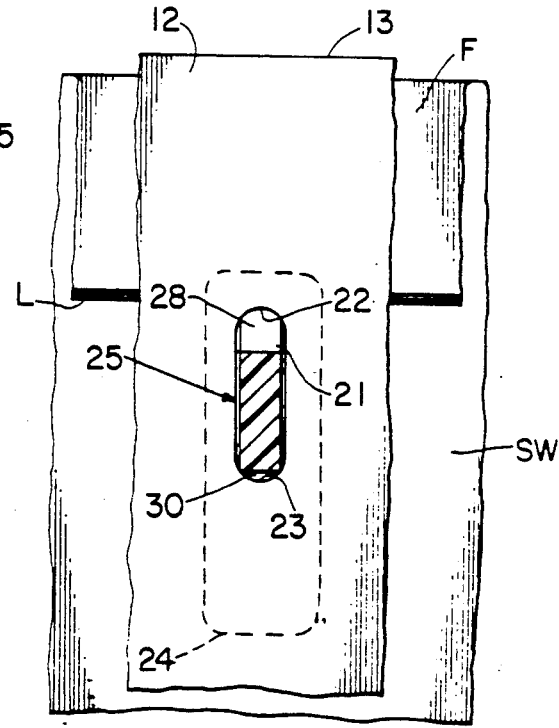
FIG. 3 is a fragmentary sectional view taken along line 3—3 of FIG. 2.
Figure 4:
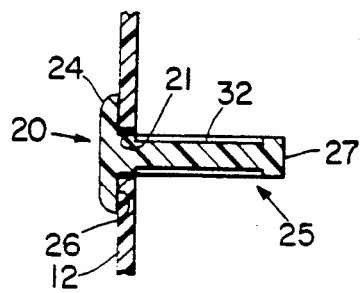
FIG. 4 is a fragmentary sectional view taken along line 4—4 of FIG. 2.

The locking tongue 25 is carried by the base plate 24 and extends a distance in laterally outward relationship to the base surface 26. It is advantageously integrally formed with the base plate and is relatively disposed thereto at a generally central location with portions of the base plate thus extending outwardly from the plane of the tongue at each side as well as extending a distance longitudinally from the opposite sides of the tongue as can be seen in FIG. 3 where the base plate 24 is diagrammatically indicated by broken lines. In side elevation, as can be seen in FIG. 2, the tongue 25 is of a complex shape, although somewhat rectangular in its overall configuration, formed with a peripheral edge 27 including three distinct peripheral edge components which are designated as clamping surface 28, cam surface 29 and locking surface 30 which are all arranged in serial relationship with respect to each other. A fourth edge surface designated as side edge portion 31 serves no particular function as to the operation of the tongue and fastening device and merely interconnects between the clamping surface 28 and the arcuate cam surface 29. The clamping and locking surfaces are both disposed in angled relationship with respect to the base surface 26 and in cooperation therewith define respective throats of V-shaped configuration that are adapted to receive in edgewise relationship the edge portions of the liner 12 and in the case of clamping surface 28 also the flange F and lip L of the cargo bed sidewall. The clamping surface 28 is of a length such that it will be capable of accommodating various dimensional differences between different cargo bed sidewalls provided with the rail and downwardly extending flanges and is advantageously oriented at about 45 degrees with respect to the base plate 24. This angular relationship results in creation of essentially equal forces in both vertical and horizontal directions with respect to the positioning of the fastening device on the liner sidewall. The horizontal forces produce a clamping effect as between the liner and the flange and its lip L and also create a vertical force in a downward direction to pull the top portions of the liner such as its top cap 13 and associated flange 14 downwardly into contacting engagement with the rail R. When assembled with the liner sidewall as shown in FIG. 2, it can be seen that the locking surface 30 which also is at a 45 degree angle to the base plate in this illustrative embodiment is capable of receiving the edge portion of the liner 12 and result in maintaining or locking of the device in this position for securing of the liner to the sidewall of the cargo bed.

In this illustrative embodiment of the fastening device 20, the tongue 25 is formed with a recessed center portion or web 32 surrounded by a peripheral rib defined by the surfaces 28-31. In an illustrative embodiment of the fastening device, the peripheral rib of the tongue has a width of the order of one-fourth inch and the thickness of that rib is of the order of one-eighth inch. A slot 33 is formed in the web 32 and extends parallel to that portion of the peripheral rib associated with the clamping surface 28. This slot 33 is of a length to extend along a substantial portion of that part of the rib and has the function of enabling a fastening device to be more readily adapted and used with various dimensioned cargo bed flanges F and lips L. Providing of this slot gives the fastening device more range as it allows looser tolerances in the location of the apertures 21 in the liner sidewall 12. Its functioning in accommodating these variations is illustrated in FIG. 9 and will be subsequently described in greater detail.

Figure 6:
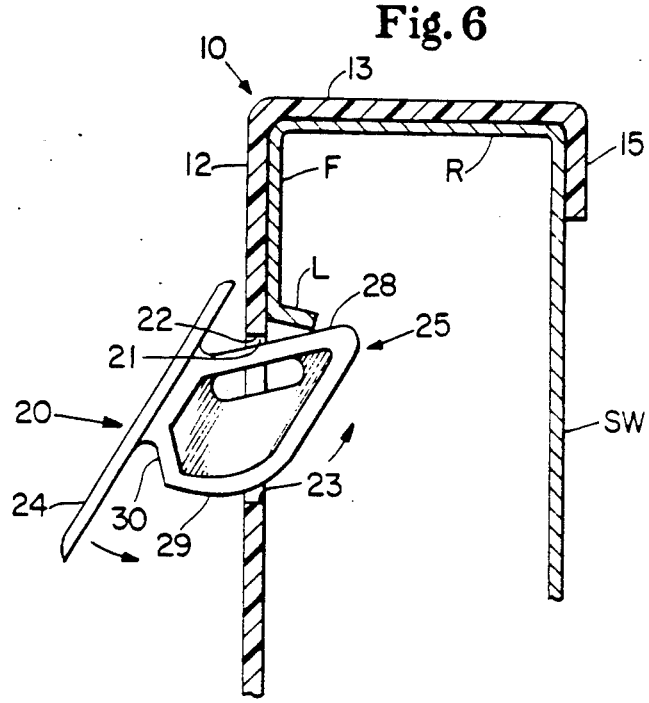
FIG. 6 is a fragmentary sectional view similar to FIG. 2, but showing a fastening device only partially assembled with a liner and cargo bed rail.
Figure 5:
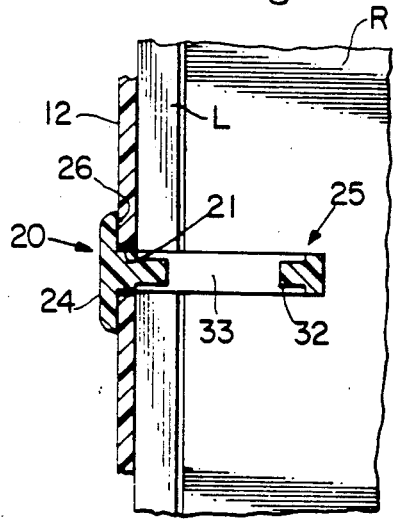
FIG. 5 is a fragmentary sectional view taken along line 5—5 of FIG. 2.
Figure 7:
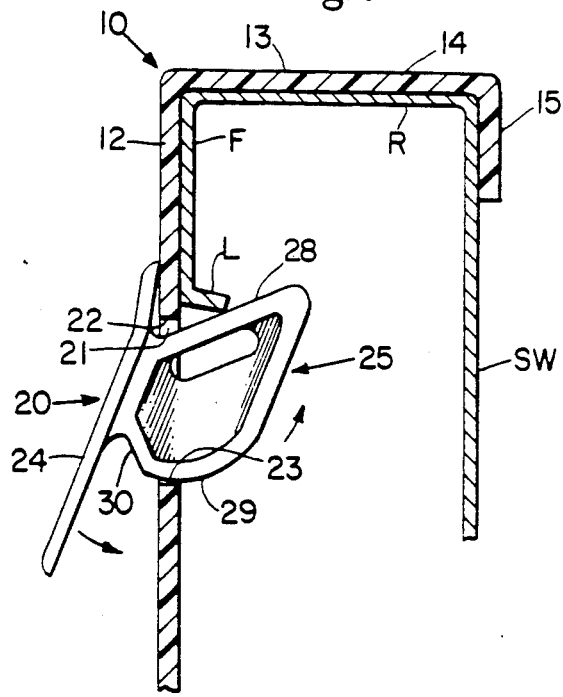
FIG. 7 is a fragmentary sectional view similar to that of FIG. 6, but showing a fastener in a further assembled position with respect to the liner and rail.

Assembly of a fastening device 20 of this invention with a liner 10 in effecting securing of the liner to the cargo bed sidewall is diagrammatically illustrated in sequential steps as shown by reference to FIGS. 6, 7 and then 2, in sequence. In FIG. 6, a liner 10 has been positioned within the cargo bed with the sidewalls 12 of the liner disposed in association with the sidewall SW of the cargo bed and the top cap 13 positioned on the rail R with the sidewall 12 placed adjacent and next to the flange F. With the liner 10 thus positioned, a fastening device 20 is then initially positioned as shown in FIG. 6 with the upper end portion associated with the clamping surface 25 projected through the aperture 21 and the camming surface 29 being brought into association with the lower end 23 of the aperture 21. Referring to FIG. 3, it will be seen that the tongue 25 has a thickness which is slightly less than the width of the aperture 21 to enable it to be pushed through and to function in effecting securing of the liner. The lower end of the tongue, specifically the cam surface 29, bears against the peripheral edges of the aperture 21 and in particular against the arcuate end portion 23. Continued movement of the fastening device from the position shown in FIG. 6 will bring the upper end of the base plate 24 into contacting engagement with the liner sidewall 12 and will cause the clamping surface 28 to bear against the edge of the lip L substantially as is shown in FIG. 7. During the course of this further movement, the upper end portion of the base plate may be flexed outwardly as is shown in FIG. 7, thereby enlarging the V-shaped throat to facilitate the insertion of the tongue through the aperture 21. For this application of the fastening devices with a liner and cargo bed, the fastening devices are advantageously fabricated from a plastic material which while providing structural rigidity will have a certain degree of resilience that permit the base plate to be flexed as is illustrated in FIG. 7.

Continuing movement of the tongue 25 through the aperture 21 will cause the cam surface 29 to continue its sliding movement over the lower end 23 of the aperture and eventually ride over the point of juncture of the cam surface with the locking surface 30. This insertion results in a downward pulling movement on the liner sidewall 12 and, when in the fully assembled position as shown in FIG. 2, the fastener will continue to exert a downward force on the liner sidewall, thereby maintaining the top cap 13 and its horizontal flange 14 in secure, contacting engagement with the cargo bed rail R. In this fully assembled position, it will be seen that the base plate 24 will return to its planar configuration with its base surface 26 in cooperation with the clamping surface 28 not only exerting a horizontal force clamping the liner sidewall 12 to the flange F, but also exerting a downward force whereby the edge portion of the liner at the bottom of the aperture will be maintained within the throat defined by the locking surface and adjacent base surface 26 of the base plate. The ability of the upper portion of the base plate to flex outwardly and enlarge the throat facilitates the assembly operation as the combined horizontal width of the liner sidewall 12 and the lip L will ride lower into the throat and thus permit the cam surface 29 to ride over the top of the lower end of the aperture 23, but will then be effective in forcing the fastening device downwardly and maintain the locking engagement. Formation of an arcuately curved surface at the lower end 23 of the aperture enhances the locking action as the side edges of the tongue are more tightly held through the fact that the tongue is being forced into the narrowing ends surfaces and the frictional contact enhances the locking.

A further advantage of the fastening device of this invention is diagrammatically illustrated in FIG. 8. The liners being molded from plastic materials and of a relatively large shape may have significant distortion and may not precisely fit the configuration of the cargo bed sidewall. Such distorted configuration that can be encountered is shown in FIG. 8. Use of the fastening device, however, will result in pulling of the liner downwardly into engagement with the rail R as well as drawing the sidewall 12 of the liner into engagement with the flange F. The initiation of this simultaneous downward and lateral movement is illustrated in FIG. 8.

Functioning of the slot 33 is diagrammatically illustrated in FIG. 9 with the fastening device formed from a plastic material having a certain degree of resilience. The peripheral rib associated with the clamping surface 28 may be flexed inwardly with respect to that slot. This again further enhances and increases the range of variations in dimension of various cargo bed wall structures and facilitate assembly of the fastening device. In FIG. 9, the variation that is illustrated is that the lip L is directed downwardly to a greatest degree than that shown in FIG. 2 and it thus will be placed in a narrower portion of the throat defined by the clamping surface 28 and the base plate 24.

Utilization of the fastening device of this invention in a slightly different application from that previously shown and described is illustrated in FIG. 10. In FIG. 10, a cargo bed liner 35 shown in side elevational view and installed within a cargo bed having a bottom wall or floor BW illustrates the ability of the fastener to secure a liner which is not provided with a top cap as is shown in FIG. 2. The cargo bed is only shown to the extent of having a longitudinally extending retainer element RE disposed a distance horizontally above the cargo bed's bottom wall BW. This retainer element may comprise the rail and flange of the cargo bed structures previously described and which are illustrated in the drawings. In this application, the cargo bed liner 35 which also has a bottom wall 36 adapted to extend over and overlie the bottom wall BW of the cargo bed and a vertical sidewall 37 is constructed and fabricated from material which is also plastic, but is of a structure that has substantial structural rigidity achieved through either selection of plastic material having greater characteristic rigidity, greater thickness, or structural design (reinforcing rib), or any combination. The structural rigidity is such that it will resist substantial compressive force applied in the plane of the sidewall 37. As in the previous illustrative application, the sidewall 37 is formed with apertures 38 of similar configuration to that previously described and located at points where appropriate for effecting securing of the liner to the sidewall retainer element of the cargo bed. A fastening device 20 is inserted through this aperture and effects securing of the liner to the retainer element RE in the same manner as described with the first illustrative embodiment and application. Again, the fastening device effects a horizontal clamping force to secure the liner against the retainer element as well as exerting a vertical force in the plane of the liner causing the liner to be pushed tightly downward onto the cargo bed bottom wall, but provide sufficient resistance to maintain the fastening device 20 in locked engagement with the liner sidewall and the retainer element.

Figure 11:
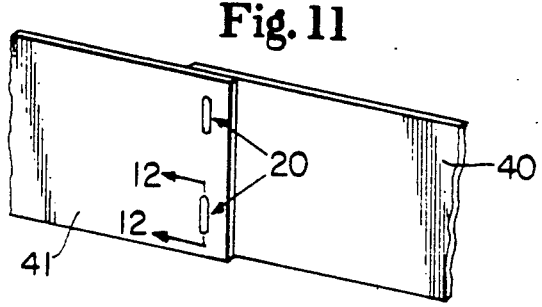
FIG. 11 is a diagrammatic perspective view showing utilization of the fasteners in securing of one panel to a fixed panel.
Figure 12:
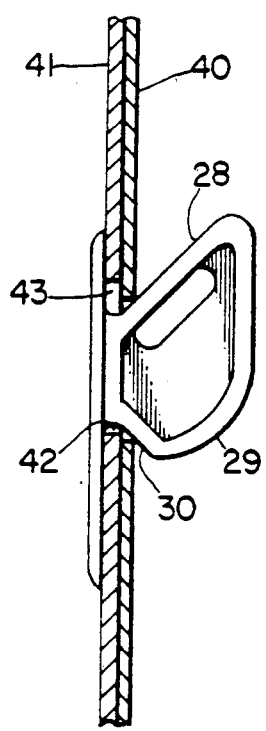
FIG. 12 is a fragmentary sectional view on an enlarged scale taken along line 12—12 of FIG. 11.

Utilization of the fastening devices in a slightly different application is shown in FIGS. 11 and 12. In that application, the fastening devices 20 are utilized to secure overlapped edges of two sheet-form panels which are generally designated by the numerals 40 and 41. One of the panels 40 is defined as a fixed panel meaning that it is either of a substantial structurally rigid construction such that it will not buckle when subjected to forces directed in the plane of the panel or that it is secured by some means to a supporting structure so as to be structurally rigid whereas the other panel 41 may be of a more flexible construction. Each of these panels is formed with respective apertures 42 and 43 at each location where a fastening device 20 is to be applied with the apertures being vertically offset to a slight degree as is best shown in FIG. 12. This offsetting arrangement thus enables the fastening device 20 to function in substantially the same manner as was described in detail with the first illustrative application. A clamping surface 28 operates on an upper end portion of the fixed panel whereas the cam surface 29 and the locking surface 30 will operate with respect to the lower end portion of the aperture 43 formed in the other panel. As can be seen from FIG. 12, the fastening devices will thus not only exert a horizontal clamping force to secure the panels in contacting engagement, but will also exert forces in the planes of the panel to effect the locking engagement.

Figure 12A:
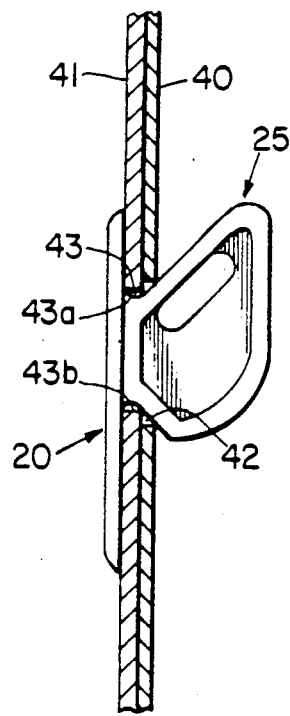
FIG. 12a is a fragmentary sectional view similar to FIG. 12, but showing a modified opening in one of the panels for receiving the tongue of a fastening device.

The fastening devices 20 of this invention may also be used to secure two panels together regardless of whether either has any significant structural rigidity as shown in FIG. 12a. This drawing figure shows two sheet-form panels 40 and 41 disposed in superposed relationship with the respective openings 42 and 43 aligned to receive the tongue 25 of a fastening device. The one opening 43 is of a length to snugly interfit with the tongue 25 with the opposed ends 43a and 43b being spaced apart a distance that is substantially equal to the spacing of the bottoms of the V-shaped throats formed by the tongue and the base plate 24. The tongue 25 will thereby operate against the opening's opposed ends 43a and 43b resulting in interlocking of the fastener to the panels.

Figure 13:
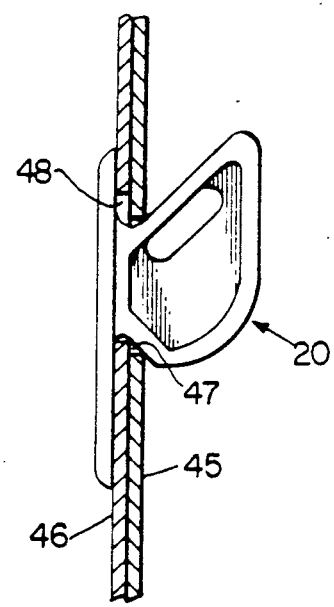
FIG. 13 is a diagrammatic sectional view showing utilization of two fasteners in cooperation securing of one sheet-form panel to a second relatively rigid panel.

Another application of the fastening devices 20 in securing of two sheet-form panels in superposed relationship is shown in FIG. 13. This application differs from that described with respect to FIGS. 11 and 12 only slightly in that two fastening devices are utilized in securing of two overlying panels 45 and 46. Again, one of the panels such as 46 is substantially structurally rigid as to resist compressive forces exerted in the plane of the panel. The two fastening devices 20 are inserted through respective apertures 47 and 48 formed in the panels 45 and 46. These apertures are also relatively offset, but as between the upper and lower sets, they are offset in opposite directions. Thus, positioning of the fastening devices in relatively opposite relationship to each other through these apertures will result in effecting a clamping force for securing the two panels in contacting engagement as well as producing opposite directed forces exerted in the plane of each of the panels and thereby effect the locking engagement.

A fastening device 50 embodying the basic structure of the devices previously described and illustrated is shown in yet another application which is associated with the securing of a bed liner in a truck cargo bed, but is also utilized in securing of a cap or top structure which overlies and covers the cargo bed to form a completely closed space. In FIG. 14, the cargo bed sidewall is shown as having substantially the same configuration as that as shown in FIG. 2 and described with respect thereto. It includes a rail R and a downwardly extending flange F having a terminal lip. The liner includes a vertical sidewall 51 provided with an aperture 52 and having a horizontal flange 53 formed at its upper end and extending over the rail R. This flange 53 may also terminate in a lip 54 extending a short distance downwardly over the outer surface of the sidewall SW and covering the upper corner of the cargo bed. The top designated generally by the letter T includes vertically extending longitudinal sidewalls ST that are provided with horizontally extending support and clamping flanges SF. A top T of this type is configured and dimensioned to have the support flange SF disposed on top of the sidewall rail R. In this application, that support flange SF also overlies and rests on the horizontal flange 53 of the liner sidewall 51.

For this application of securing a top T to a pickup truck cargo bed, the fastening devices 50 are advantageously fabricated from steel to provide sufficient structural rigidity. Each of the fastening devices 50 comprises a base element 55 which is fabricated with substantially the same configuration as that of the devices previously illustrated and described. It thus includes a base plate 56 and a locking tongue 57 with that locking tongue again having the same peripheral edge surfaces as described in connection with the previously described devices to effect clamping and locking functions as well as facilitating assembly with the liner and the cargo bed sidewall flange. Additionally, this fastening device includes a second or auxiliary clamping element 58 which cooperates to apply a downward clamping force against the support flange SF of the top T. This second clamping element 58 includes a tubular sleeve 59 that is secured to the base plate 56 as by welding and a J-shaped clamp rod 60 having an elongated connector leg 61 adapted to extend axially through the sleeve 59. The one end of the clamp rod is formed into a J-shaped configuration having a transverse leg 62 of sufficient length to project a distance over the rail R and associated support flange SF of the top T terminating in a downwardly extending clamping leg 63. This clamping leg 63 is provided at its terminal lower end with a pressure distribution pad 64 that engages with the opposed surface of the support flange SF. The end of the elongated leg 61 opposite the J-shaped end portion is provided with a threaded nut 65 utilized to apply the clamping force to the top T.

This fastening device 50 is initially applied as in the case of previously described embodiments to first secure the liner sidewall 51 to the cargo bed sidewall by means of the base element 55 through insertion of the locking tongue 57 through the aperture 52. Once the base element 55 has been assembled with the liner and locking the liner to the flange F with the top T then in place as shown in FIG. 14, the second clamping element 58 is assembled by extending the connector leg 61 which is provided with screw-threads at its free end downwardly through the sleeve 59 and bringing the clamping leg 63 with its associated pressure distribution pad 64 into engagement with the support flange SF of the top T. A threaded nut 65 is then applied to the threaded end of the connector leg 61 projecting out the bottom end of the sleeve and it is tightened to create a downward clamping force against the support flange SF. Removal of the top T is effected by merely reversing the assembly operation as by first removing the nut 65 to release the second clamping element 58 and, if it is desired to remove the liner, the base element 55 of fastening devices 50 may be swung outwardly in a reverse manner. It will be understood that the fastening devices previously described may also be removed in a similar manner through utilization of an appropriate tool to produce the necessary force to pull the fastening devices from the assembled components.

Another modified fastening device 70 embodying the basic structure of the devices previously described and illustrated is shown in an application that is related to the cargo transporting functions of a pickup truck in addition to performing its primary function of securing a liner in the cargo bed of a pickup truck. This modified fastening device 70 illustrated in FIGS. 15, 16 and 17 is designed to also provide a tie-down point for ropes or other types of tie-down straps often required to secure cargo within the cargo bed and is shown in FIG. 15 assembled with a cargo bed of typical construction similar to that previously described with reference to the associated drawing figures. Again, only the upper portion of a sidewall SW is illustrated and it is provided with a top rail R having a downwardly projecting flange F formed at its inner edge with the flange terminating in a short, laterally extending lip L. The upper portion of a liner sidewall 71 having a top cap 72 which includes a horizontal flange 73 that overlies the rail R and a lip 74 extending a short distance down over the outside of the sidewall SW. It is to be understood that the member of these fastening devices 70 that will be utilized with a particular cargo bed is determined by the number of tie-down points that are deemed necessary.

The fastening device 70 includes a liner fastening element 75 which includes a base plate 76 that is adapted to overlie the liner sidewall 71 and locking tongue means 77 that, for this application, advantageously comprises two locking tongues 78. This fastening element is preferably made of steel to obtain structural strength and rigidity, but certain plastics may be suitable where lesser strength is acceptable. Each of the locking tongues 78 is of the same planar configuration as those previously described having a peripheral edge including the clamping cam and locking surfaces for performing the same aforedescribed functions. The base plate 76 in this embodiment is wider than the base plates of the previously described fastening devices to better accommodate the two locking tongues 78 which are spaced a distance apart in parallel relationship. While not illustrated in the drawing figures, it will be understood that the liner sidewall 71 is provided with either a pair of elongated, vertically oriented apertures 79 for receiving respective ones of the two locking tongues 78 or a single aperture of sufficient width to receive both tongues.

A tie-down bracket 80 is provided with this fastening device 70 to provide a point along the cargo bed sidewall to which cargo tie-down or securing ropes (not shown) may be attached or connected. This bracket 80, preferably fabricated from steel to obtain desired structural strength, and formed from a flat strap, is of J-shape having an elongated connector leg 81 adapted to mechanically interconnect with the base plate 76, a transverse clamp leg 82 that extends over the rail R and the flange 73 of the liner's top cap 72 and a retainer leg 83 which projects a distance downwardly over the lip 74 and a portion of the sidewall SW. The connector leg 81 is mechanically interconnected with the base plate 76 by means permitting relative adjustment for enabling the clamp leg 82 to be positioned in clamping relationship to the liner flange 73 overlying the rail R. Secured to the upper side of the clamp leg 82 is a tie-down element 84 adapted to receive and interconnect with a rope or other cargo securing apparatus. In this illustrative embodiment, the tie-down element 84 comprises a closed ring 85 secured as by welding to the clamp leg 82 at about its midpoint and disposed in upstanding relationship thereto. A hook 86 may be integrally formed with the ring 85 and oriented to project relatively outward of the cargo bed to provide greater versatility in securing of tie-downs.

Mechanical interengagement of the tie-down brackets' connector leg 81 with the liner fastening element 75 in this illustrative embodiment is effected through an interlocking, ratchet tooth mechanism. Formed in the base plate 76 is an elongated slot 87 extending longitudinally thereof between the two locking tongues 78 and open at each of the plate's ends. This slot 87 is of a width to receive the tie-down brackets' connector leg 81 and permit it to be slideable longitudinally therethrough. It is of a depth substantially equal to the thickness of the connector leg whereby, when the connector leg is positioned in the slot 87 in interlocked engagement, the exposed surface of the connector leg will be flush with the base surface 88 of the base plate. Formed in the bottom wall of the slot 87 are a series of ratchet teeth 89 which is for a length that is adequate for the degree of adjustability that is required to enable assembly of the tie-down bracket 80 in secure clamping engagement with the rail R and the liner top cap 72. The tie-down bracket's connector leg 81 also has a series of ratchet teeth 90 of a configuration to mate with the teeth 89 in the slot formed on the surface that faces into the slot.

In assembly of this fastening device 70, the liner fastening element 75 is first assembled with the liner sidewall 71 and cargo bed sidewall SW, flange F and lip L in a manner such as was described with the other embodiments. Secondly, the tie-down bracket 80 is then assembled with the liner fastening element 75 by inserting its connector leg 81 into the slot 87 and pushing it downwardly through the slot. The liner sidewall 71 being formed of a plastic material has a certain degree of resilience and is sufficiently compressible to permit the ratchet teeth 89 and 90 to ride over each other enabling the bracket to be positioned in secure, interfitting relationship over the rail R and top cap 72 of the liner. If necessary to effect the desired interengagement, the base plate 76 may be held to resist downward movement that may otherwise be induced by frictional forces developed as a consequence of the ratchet teeth being moved over each other. Disassembly for removal of the tie-down bracket can be effected by utilizing appropriate tools to separate the ratchet teeth 89 and 90 enabling the connector leg 81 to be pulled out of the base plate slot 87.

It will be readily apparent from the preceding description of illustrative embodiments of the fastening device of this invention and its functional relationship with truck bed liners that securing of such liners to a pickup style truck bed can be readily and expeditiously accomplished. The fastening devices of this invention eliminate the need for any auxiliary elements for effecting the securing of the device in holding of a liner in association with the cargo bed. These fastening devices may also be utilized in other applications where sheet-form panels are secured in a similar manner and are effectively locked into secure engagement to maintain the panels in superposed relationship. Assembly is accomplished with little effort as the fastening devices are constructed with a cam surface that facilitates the assembly. A fastening device embodying this invention includes in its basic structure a base plate having a uniquely configured locking tongue projecting laterally from the plate and which, in cooperation with the plate, functions to effect clamping of a bed liner to a flange of a cargo bed sidewall while concurrently and automatically locking the device to the liner without necessity of auxiliary securing devices. Auxiliary clamping elements or other securing components such as clamps for securing of camper tops or bed covers to a cargo bed rail or for providing of tie-down down points to facilitate securing of cargo in the bed may be provided in combination with a basic fastening device to enhance its utility and versatility. By forming two or more locking tongues on a single base plate, the ability of a fastening device to resist torsional forces, such as those which may be encountered during utilization for tie-down of cargo, is substantially increased.

Having thus described this invention, what is claimed is:

1. A fastener for mechanically securing a sheet-form panel to a supporting element including a flange, said fastener comprising:

a base plate having a base surface for engagement with a surface of a panel to be secured; and a locking tongue of generally planar configuration attached to said base plate and extending laterally outwardly from said base surface, said tongue having a peripheral edge and further comprising a clamping surface, a cam surface, and a locking surface arranged in series about said peripheral edge with said cam surface interposed between said clamping and locking surfaces, said clamping and locking surfaces joined to said base surface in spaced relationship to each other, each of said clamping and locking surfaces disposed in angled relationship to said base surface and defining therewith first and second V-shaped throats extending in relatively opposite directions, said first throat formed between said locking and base surfaces and receiving portions of said panel in edgewise secured relationship to effect a locking engagement in use, said cam surface being of arcuate configuration and operable to slide over said panel upon insertion of said fastener to facilitate movement of said first V-shaped throat into said locking engagement with said panel and to effect a mechanical leveraging of said tongue and causing said clamping surface to bear against said flange thereby providing both downward and horizontal locking forces to said panel relative to said supporting element.

2. A fastener according to claim 1 wherein the clamping surface of said tongue is substantially straight and is disposed at an angle of about 45 degrees with respect to the base surface of said base plate.

3. A fastener according to claim 1 wherein said locking tongue is fabricated from a material exhibiting resilient characteristics and has an aperture formed in inwardly spaced relationship to said clamping surface, said aperture having a peripheral edge portion substantially aligned with and extending a substantial distance in coextensive relationship with said clamping surface and spaced inwardly therefrom, whereby the peripheral edge portion of said tongue can flex relatively inwardly for accommodating dimensional and configuration variation of diverse truck cargo beds.

4. A fastener according to claim 1 wherein said locking surface is substantially straight and connects at its outer end with said cam surface.

5. A fastener according to claim 1 wherein said cam surface connects at one end with said locking surface and curves in a direction outwardly from said base plate and said clamping surface.

6. A fastener according to claim 1 wherein said base plate has peripheral edge portions and said clamping and locking surfaces each join with said base plate at respective points spaced a distance inwardly from respective adjacent peripheral edge portions of said base plate.

7. A fastener according to claim 6 wherein said clamping surface is of a length to extend a distance beyond the peripheral edge of said base plate.

8. A fastener according to claim 1 wherein said locking tongue has a thickness and said base plate is of a dimension to extend a distance laterally outward from at least one side of said locking tongue.

9. A fastener according to claim 1 wherein said locking tongue has a thickness and said base plate is of a dimension to extend a distance laterally outward from each side of said locking tongue.

10. A fastener according to claim 1 which includes at least two locking tongues, each of said tongues being of planar configuration and disposed in spaced relationship on said base plate with the respective peripheral edges thereof substantially aligned.

11. A fastener according to claim 10 wherein said locking tongues are disposed in spaced parallel relationship.

12. A fastener according to claim 1 wherein said base plate has peripheral edge portions and said clamping surface joins with said base plate at a point spaced a distance inwardly from an adjacent peripheral edge portion of said base plate, and said base plate is fabricated from a material exhibiting a resilient characteristic whereby at least a portion of said base plate may be flexed away from said clamping surface to thereby facilitate locking engagement of the fastener with a sheet-form panel and will thereafter return toward its original disposition.

13. A fastener according to claim 1 which includes an auxiliary clamping element carried on said base plate and operable to develop a clamping force directed toward said locking tongue's clamping surface to effect clamping with respect to said tongue.

14. A fastener according to claim 13 wherein said auxiliary clamping element includes a clamp rod coupled with said base plate and adjustably positionable with respect thereto to selectively adjust the clamping force effected thereby.

15. A fastener according to claim 14 wherein said clamp rod includes an elongated connector portion extending in substantially coplanar relationship to the plane of said locking tongue, an elongated tubular sleeve secured to said base plate for axially receiving said rod connector portion in longitudinally slideable relationship, and means mechanically coupled between said rod and said sleeve for applying a clamping force through said clamp rod and maintaining of said clamp rod in a fixed position with respect to said base plate.

16. A fastener according to claim 14 wherein said clamp rod includes an elongated connector portion extending in substantially coplanar relationship to the plane of said locking tongue and coupled with said base plate, and a clamping leg carried by said connector portion to be remotely disposed with respect to said locking tongue to effect application of a clamping force to an element disposed between said clamping leg and said locking tongue.

17. A fastener according to claim 14 wherein said clamp rod is J-shaped having an elongated connector leg coupled with said base plate, a transverse leg carried by said connector leg to be remotely disposed with respect to said locking tongue and project a distance laterally from said connector leg, and a clamping leg carried by said transverse leg in laterally offset relationship to said connector leg.

18. A fastener according to claim 1 which includes a tie-down bracket carried by said base plate for attachment thereto of tie-down devices to effect securing of articles with respect thereto.

19. A fastener according to claim 18 wherein said tie-down bracket includes an elongated connector leg coupled with said base plate and extending a distance therefrom in substantially parallel relationship to the plane of said locking tongue, a transverse clamp leg carried by said connector leg and projecting laterally therefrom in a direction to overlie said locking tongue in superposed relationship to the clamping surface of said locking tongue, and a tie-down element carried by said clamp leg in fixed relationship thereto for mechanical interengagement with tie-down devices.

20. A fastener according to claim 19 wherein said tie-down bracket includes a retainer leg carried by said clamp leg in spaced relationship to said connector leg and extending a distance in a direction to form in cooperation with said clamp and connector legs a U-shaped socket.

21. A fastener according to claim 19 wherein said base plate and said connector leg are mechanically coupled by adjustable means for enabling said connector leg to be selectively positioned with respect to said base plate to position said clamp leg in predetermined spaced relationship to said locking tongue.

22. A fastener according to claim 21 wherein said adjustable means includes interfitting tooth and socket elements formed on opposed surfaces of said base plate and said connector leg.

23. A fastener according to claim 22 wherein said connector leg is of flat, plate-form and said base plate is formed with a slot configured to receive said connector leg in mating relationship and open at the base surface of said base plate.

24. A fastener according to claim 23 wherein one of said interfitting tooth and socket elements is formed on the bottom surface of said slot and the other is formed on a surface of said connector leg.

25. A fastener according to claim 22 wherein said interfitting tooth and socket elements are a series of ratchet teeth extending over predetermined lengths of each of said base plate and said connector leg, said ratchet teeth being oriented to prevent movement of said connector leg in a direction relative to said base plate to separate said clamp leg with respect to said locking tongue.

26. A fastener according to claim 19 which includes at least two locking tongues, each of said locking tongues being of planar configuration and disposed in spaced relationship to each other with said connector leg disposed between said tongues.

27. A fastener according to claim 1, wherein at least a portion of said fastener is resiliently flexible.

28. A fastener according to claim 27, wherein said clamping surface is resiliently flexible.

29. A fastener according to claim 28, wherein said tongue includes a slot formed in inwardly spaced relationship to said clamping surface and extending along at least a portion of said clamping surface to enable said clamping surface be flexed inwardly.

30. A fastener according to claim 1, wherein said downward and horizontal forces provided by said fastener are essentially equal.

31. The combination of (1) a truck cargo bed having an interior and a sidewall terminating at an upper longitudinally extending edge in a rail having a substantially vertical flange disposed in inwardly spaced relationship to said sidewall.
(2) a protective liner for said cargo bed having a configuration substantially complemental to the interior of said cargo bed, said liner having a vertically extending sidewall disposed adjacent said cargo bed sidewall with an upper marginal edge portion overlying said cargo bed flange in superposed relationship, and an elongated aperture formed in said liner sidewall, said elongated aperture extending a distance downwardly from the bottom edge of the cargo bed flange, and
(3) a fastener for mechanically securing said liner sidewall to said cargo bed flange, said fastener further comprising:
a) a base plate having a base surface for engagement with a surface of said liner sidewall to be secured by said fastener to said cargo bed flange, and
b) a locking tongue of generally planar configuration attached to said base and extending laterally outwardly from said base surface, said tongue having a peripheral edge and further comprising a clamping surface, a cam surface, and a locking surface arranged in series about said peripheral edge with said cam surface interposed between said clamping and locking surfaces, said clamping and locking surfaces joined to said base surface in spaced relationship to each other, each of said clamping and locking surfaces disposed in angled relationship to said base surface and defining therewith first and second V-shaped throats extending in relatively opposite directions, said first throat formed between said locking surface and base surface receiving portions of said panel in edgewise secured relationship to effect a locking engagement in use, said cam surface being of arcuate configuration and operable to slide over said panel upon insertion of said fastener into said aperture to facilitate movement of said first V-shaped throat into locking engagement with said panel and to effect a mechanical leveraging of said tongue and causing said clamping surface to bear against said flange, thereby providing both downward and horizontal locking forces to said panel relative said supporting element.

32. The combination defined in claim 31 in which said liner sidewall includes a laterally extending flange formed at its upper edge and projecting over the cargo bed rail in contacting engagement therewith, said fastener locking tongue operable to effect a downwardly directed force on said liner through opposed forces exerted by said clamping surface against said flange and said locking surface against said liner.

33. The combination of claim 31 which includes a top cover positioned on the cargo bed and having a support flange at its bottom disposed on said cargo bed rail and in which said fastener includes an auxiliary clamping element carried on said base plate and operable to develop a clamping force against said top support flange for clamping thereof to said rail.

34. The combination of claim 31 in which said fastener includes a tie-down bracket carried by said base plate for attachment thereto of tie-down devices to effect securing of articles in the truck cargo bed.

35. A fastening device for securing a sheet-form panel liner adjacent a supporting element of a truck bed having a downwardly projecting flange with a bottom edge formed with an outwardly extending lip, said panel having an aperture with upper and lower ends positioned such that its upper end will be located slightly below said bottom edge of said flange in use, said fastener comprising:
a base plate having a base surface for engagement with a surface of said panel, said base surface having peripheral edge portions which extend outwardly to substantially cover said aperture in use;
a locking tongue attached to said base and extending laterally outwardly from said base surface, said locking tongue further comprising a clamping surface, a cam surface, a locking surface, and means for permitting at least a portion of said tongue to resiliently flex, said tongue designed to be projected through said aperture in use and said clamping surface extending upwardly from said base surface at an angle for engagement with said lip; and said tongue being projected through said aperture such that said cam surface bears against the lower end of said aperture to effect a mechanical leveraging of said tongue and causing said clamping surface to bear against said lip as said tongue is further projected to provide both downward and horizontal locking forces to said panel relative to said supporting element, and wherein upon full projection of said tongue through said aperture and said locking surface shall maintain locking engagement of said device with said panel while said cam surface maintains clamping contact with said lip.

* * * * *

UNITED STATES PATENT AND TRADEMARK OFFICE
CERTIFICATE OF CORRECTION

PATENT NO. : 5,046,775

DATED : September 10, 1991

INVENTOR(S) : Howard W. Marcum, Jr., John R. Snyder and Robert E. Stebens

It is certified that error appears in the above-identified patent and that said Letters Patent is hereby corrected as shown below:

Column 17 - Claim 31 - Line 57 - "sidewall." should be deleted and replaced with --sidewall,--.

Column 20 - Claim 35 - Line 6 - After "aperture" insert --said cam surface will slide over said lower end of said aperture--.

Signed and Sealed this

Ninth Day of March, 1993

Attest:

STEPHEN G. KUNIN

*Attesting Officer*     *Acting Commissioner of Patents and Trademarks*

REEXAMINATION CERTIFICATE (2152nd)
United States Patent [19]

Marcum, Jr. et al.

[11] B1 5,046,775

[45] Certificate Issued Dec. 14, 1993

[54] SNAP-LOCK FASTENER FOR TRUCK BED LINERS

[75] Inventors: Howard W. Marcum, Jr.; John R. Snyder, both of Wapakoneta; Robert E. Stebens, Columbus, all of Ohio

[73] Assignee: LRV Acquisition Corp., Wapakoneta, Ohio

Reexamination Request:
No. 90/003,019, Apr. 1, 1993

Reexamination Certificate for:
Patent No.: 5,046,775
Issued: Sep. 10, 1991
Appl. No.: 505,783
Filed: Apr. 6, 1990

Certificate of Correction issued Mar. 9, 1993.

[51] Int. Cl.$^5$ .................... B60R 13/01; F16B 5/00
[52] U.S. Cl. .................... 296/39.2; 411/508; 411/913; 24/297
[58] Field of Search .......... 296/39.2; 411/508, 509, 411/510, 908, 913; 24/453, 297, 573.2; 52/511

[56] References Cited

U.S. PATENT DOCUMENTS 4,305,182 12/1981 Peterson .................... 24/289
4,572,568 2/1986 Kapp et al. .................... 296/39.2

OTHER PUBLICATIONS

Futurex advertising publications distributed 1987–88.

*Primary Examiner*—Joseph D. Pape

[57] ABSTRACT

A fastening device is provided for securing of liners to the interior of pickup truck cargo beds. The fastening devices include a base plate which overlies the outer surface of a bed liner and a locking tongue projecting laterally from a bottom of the plate to extend through an aperture in the liner sidewall and to mechanically couple with a flange of the cargo bed sidewall to effect clamping of the liner to the flange. The locking tongue is formed with a peripheral edge surface that includes a locking surface angularly disposed with respect to the base plate forming in cooperation therewith for receiving edge portions of the liner and flange in clamped relationship, a camming surface that rides against an edge of the aperture in the liner during insertion to facilitate assembly and a locking surface that automatically engages the liner to maintain the fastening device in locking engagement. Auxiliary components in the nature of secondary clamping brackets, or connecting devices to which cargo tie-down devices may be attached, are provided in combination with the basic fastening device in modified structures. Modified forms of the basic fastening device are provided with a plurality of locking tongues to enhance the device's ability to resist torsional forces such as those likely encountered when used to also function as a cargo tie-down point.

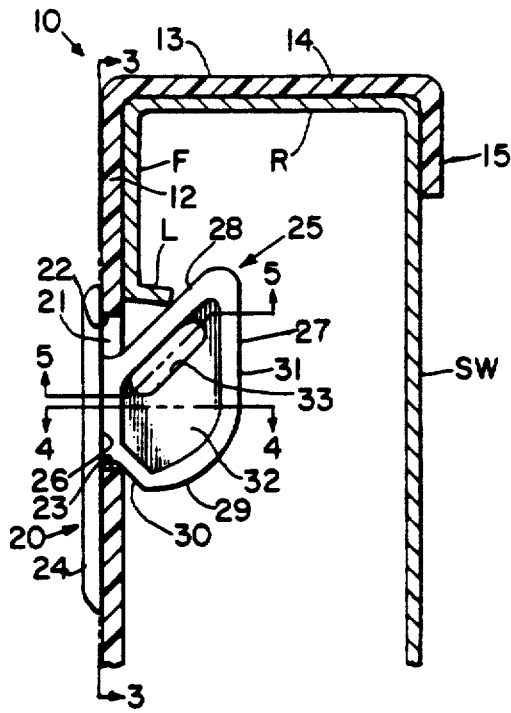

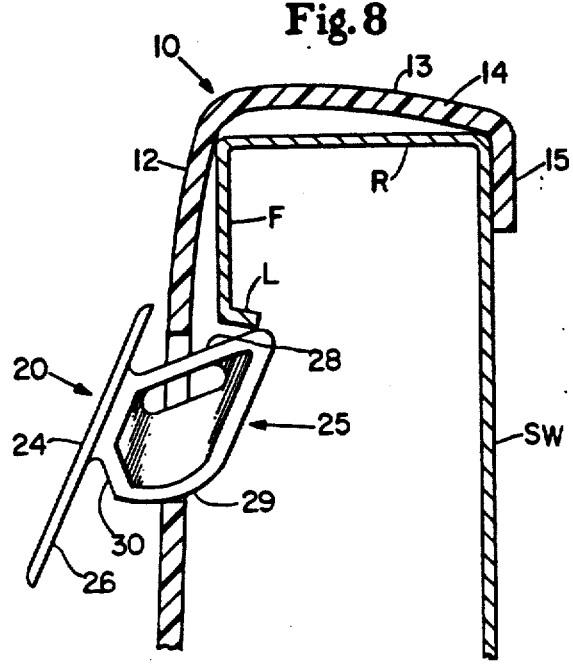
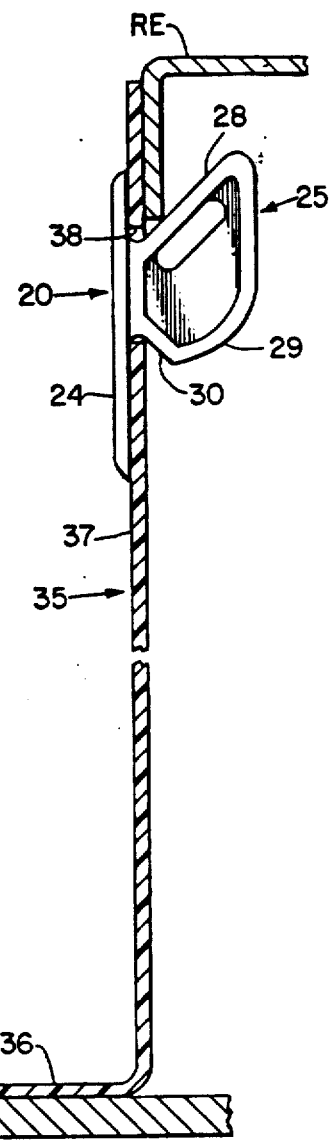
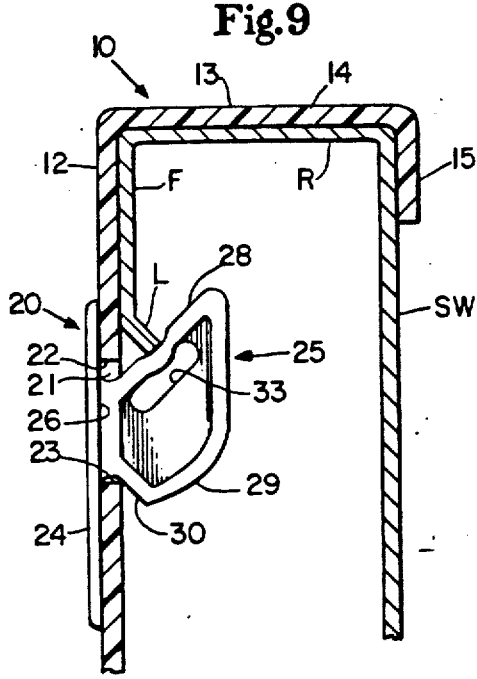

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

The drawing figures have been changed as follows: The size of the aperture 21 in FIGS. 9 and 10 has been made smaller so that the formal drawings are made to be identical to the originally filed informal drawings.

AS A RESULT OF REEXAMINATION, IT HAS BEEN DETERMINED THAT:

The patentability of claims 1–34 is confirmed.

Claim 35 is determined to be patentable as amended.

35. A fastening device for securing a sheet-form panel liner adjacent a supporting element of a truck bed having a downwardly projecting flange with a bottom edge formed with an outwardly extending lip, said panel having an aperture with upper and lower ends positioned such that its upper end will be located slightly below said bottom edge of said flange in use, said fastener comprising:

a base plate having a base surface for engagement with a surface of said panel, said base surface having peripheral edge portions which extend outwardly to substantially cover said aperture in use;

a locking tongue attached to said base and extending laterally outwardly from said base surface, said locking tongue further comprising a clamping surface [a] *an arcuate* cam surface, a locking surface, and means for permitting at least a portion of said tongue to resiliently flex, *said clamping and locking surfaces joined to said base surface in spaced relationship to each other,* said tongue designed to be projected through said aperture in use and said clamping sureface extending upwardly from said base surface at an angle for engagement with said lip; and said tongue being projected through said aperture such that said cam surface bears against the lower end of said aperture to effect a mechanical leveraging of said tongue and causing said clamping surface to bear against said lip as said tongue is further projected to provide both downward and horizontal locking forces to said panel relative to said supporting element, and wherein upon full projection of said tongue through said aperture and said locking surface shall maintain locking engagement of said device with said panel while said cam surface maintains clamping contact with said lip.

* * * * *